US012803747B2

(12) United States Patent
Wang et al.

(10) Patent No.: US 12,803,747 B2
(45) Date of Patent: Nov. 17, 2026

(54) TIME WINDOW DETERMINATION METHOD, TERMINAL, AND NON-TRANSITORY STORAGE MEDIUM

(71) Applicant: VIVO MOBILE COMMUNICATION CO., LTD., Dongguan (CN)

(72) Inventors: Yong Wang, Dongguan (CN); Kai Wu, Dongguan (CN); Lihui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 199 days.

(21) Appl. No.: 18/617,847

(22) Filed: Mar. 27, 2024

(65) Prior Publication Data

US 2024/0235779 A1 Jul. 11, 2024

Related U.S. Application Data

(63) Continuation of application No. PCT/CN2022/121272, filed on Sep. 26, 2022.

(30) Foreign Application Priority Data

Sep. 29, 2021 (CN) .......................... 202111153057.1

(51) Int. Cl.
*H04L 5/00* (2006.01)
*H04W 72/0446* (2023.01)

(52) U.S. Cl.
CPC ....... *H04L 5/0051* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 11,101,950 | B2 | 8/2021 | Manolakos et al. | |
| 12,225,458 | B2 * | 2/2025 | Cozzo ................. | H04W 52/281 |
| 2014/0198864 | A1 | 7/2014 | Manzi et al. | |
| 2020/0337030 | A1 | 10/2020 | Zhang | |

(Continued)

FOREIGN PATENT DOCUMENTS

| | | | |
|---|---|---|---|
| CN | 110766051 | A | 2/2020 |
| CN | 111567002 | A | 8/2020 |
| CN | 112702779 | A | 4/2021 |

(Continued)

OTHER PUBLICATIONS

China Telecom, "[106-e-NR-R17-CovEnh-03] Summary of email discussion on joint channel estimation for PUSCH", 3GPP TSG RAN WG1 #106-e, e-Meeting, Aug. 16-27, 2021, R1-2108644.

(Continued)

*Primary Examiner* — Brian S Roberts

(74) *Attorney, Agent, or Firm* — The Webb Law Firm

(57) ABSTRACT

A time window determination method includes determining, by a terminal, at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

20 Claims, 6 Drawing Sheets

(56) References Cited

U.S. PATENT DOCUMENTS

| | | | |
|---|---|---|---|
| 2021/0014095 A1 | 1/2021 | Ly et al. | |
| 2025/0056506 A1* | 2/2025 | Shim | H04L 1/08 |

FOREIGN PATENT DOCUMENTS

| | | | |
|---|---|---|---|
| CN | 113228577 A | 8/2021 | |
| CN | 111194575 B | 4/2023 | |
| EP | 4319037 A1 | 2/2024 | |
| WO | 2019140342 A1 | 7/2019 | |
| WO | 2020111839 A1 | 6/2020 | |
| WO | 2020252622 A1 | 12/2020 | |
| WO | 2021159362 A1 | 8/2021 | |

OTHER PUBLICATIONS

Conceicao, Filipe et al., "An OFDM-based waveform with high spectral efficiency", IEEE, 2020.
Intel Corporation, "Discussion on joint channel estimation for PUSCH", 3GPP TSG RAN WG1 #106-e, eMeeting, Aug. 16-27, 2021, R1-2107604.
Nokia et al., "Joint channel estimation for PUSCH coverage enhancements", 3GPP TSG RAN WG1 #196-e, e-Meeting, Aug. 16-27, 2021, R1-2106657.
ZTE Corporation, "Discussion on joint channel estimation for PUSCH", 3GPP TSG RAN WG1 #106-e, e-Meeting, Aug. 16-27, 2021, R1-2106741.
3GPP, "3rd Generation Partnership Project; Technical Specification Group Radio Access Network; NR; Physical layer procedures for data (Release 16)", 3GPP TS 38.214, Jun. 2021, V. 16.6.0.

* cited by examiner

TIME WINDOW DETERMINATION METHOD, TERMINAL, AND NON-TRANSITORY STORAGE MEDIUM

CROSS-REFERENCE TO RELATED APPLICATIONS

This application is a Bypass Continuation Application of International Patent Application No. PCT/CN2022/121272 filed Sep. 26, 2022, and claims priority to Chinese patent application Ser. No. 202111153057.1 filed Sep. 29, 2021, the disclosures of which are hereby incorporated by reference in their entireties.

BACKGROUND OF THE INVENTION

Field of the Invention

This application pertains to the field of communications technologies, and specifically relates to a time window determination method, a terminal, and a non-transitory storage medium.

Description of Related Art

When demodulation reference signal (DMRS) bundling is enabled for an uplink repetition, a DMRS bundling time window is configured based on continuous physical slots, and user equipment (UE) within the time window is expected to maintain an uplink transmission with power consistency and phase continuity. However, due to some configurations or transmission behaviors indicated by signaling, the UE cannot maintain the uplink transmission with power consistency and phase continuity. Consequently, demodulation performance of joint channel estimation at a receive end is affected, and a coverage capability is ultimately reduced.

SUMMARY OF THE INVENTION

According to a first aspect, a time window determination method is provided. The method includes:

determining, by a terminal, at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

According to a second aspect, a time window determination apparatus is provided. The apparatus includes:

a determining module, configured to determine at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

According to a third aspect, a terminal is provided. The terminal includes a processor, a memory, and a program or instructions stored in the memory and executable on the processor. When the program or instructions are executed by the processor, the steps of the method according to the first aspect are implemented.

According to a fourth aspect, a terminal is provided. The terminal includes a processor and a communication interface. The processor is configured to determine at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

According to a fifth aspect, a non-transitory readable storage medium is provided. The non-transitory readable storage medium stores a program or instructions. When the program or instructions are executed by a processor, the steps of the method according to the first aspect are implemented.

According to a sixth aspect, a chip is provided. The chip includes a processor and a communication interface. The communication interface is coupled to the processor. The processor is configured to run a program or instructions to implement the method according to the first aspect.

According to a seventh aspect, a computer program or program product is provided. The computer program or program product is stored in a non-transitory storage medium. The program or program product is executed by at least one processor to implement the steps of the time window determination method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
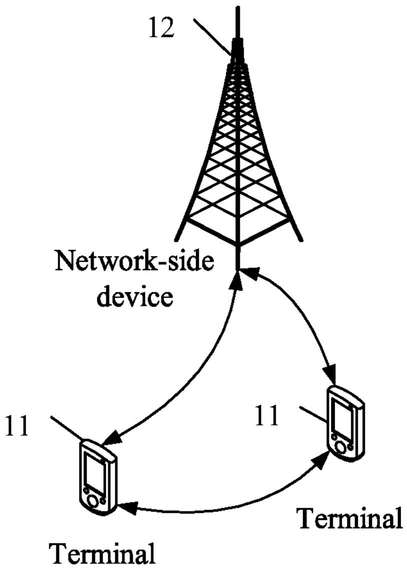
FIG. 1 is a structural diagram of a wireless communications system to which an embodiment of this application may be applied.

FIG. 1 is a structural diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, a vehicular user equipment (VUE), a pedestrian user equipment (PUE), or a smart home (a home device having a wireless communication function, such as a refrigerator, a television, a washing machine, or furniture). The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, a game console, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a home NodeB, a home evolved NodeB, a WLAN access point, a Wi-Fi node, a transmission and reception point (TRP), or another appropriate term in the art. As long as the same technical effect is achieved, the base station is not limited to specific technical terms. It should be noted that in the embodiments of this application, only a base station in an NR system is used as an example, but a specific type of the base station is not limited.

A time window determination method and apparatus provided in the embodiments of this application are hereinafter described in detail by using some embodiments and application scenarios thereof with reference to the accompanying drawings.

UE can maintain power consistency and phase continuity in a process of transmitting multiple physical uplink shared channels (PUSCH). Then in a case that a network-side device receives the multiple PUSCHs, the network-side device can obtain, based on a demodulation reference signal (DMRS) of one PUSCH, channel information transmitted in other PUSCHs. In this case, the DMRS in the multiple PUSCHs can be used for joint channel estimation to improve reception performance. This technology is referred to as DMRS bundling. It should be understood that the multiple PUSCHs herein may be different repetitions in same PUSCH scheduling, or may be transport block over multiple slots TBoMS (TB over Multiple Slots) in same PUSCH scheduling, or may be PUSCHs in different PUSCH scheduling.

A DMRS bundling time window (TDW) is defined as duration within which UE is expected to maintain power consistency and phase continuity among multiple PUSCH transmissions, so that a receive end performs joint channel estimation within the time window. An uplink transmission with power consistency and phase continuity means that at least the following conditions should be met among multiple uplink transmissions:

(1) phases are continuous, or a phase difference is within a specified threshold range;

(2) power remains unchanged, or a power difference is within a specified threshold range;

(3) a same modulation mode is used;

(4) a same frequency position is used;

(5) a same bandwidth is used;

(6) a same antenna port is used;

(7) a same spatial transmission filter is used;

(8) same transmission precoding is used;

(9) no timing advance (TA) adjustment or time offset adjustment of the UE is performed autonomously; and

(10) no update of a transmit power control (TPC) command is applied.

In an actual transmission, due to some configurations or transmission behaviors indicated by signaling, an uplink transmission with power consistency and phase continuity cannot be maintained. Consequently, demodulation performance of joint channel estimation at a receive end is affected, and a coverage capability is ultimately reduced.

Figure 2:
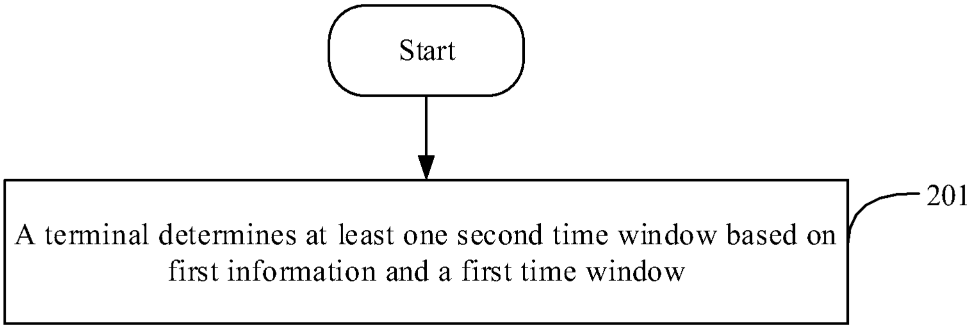
FIG. 2 is a schematic flowchart of a time window determination method according to an embodiment of this application.

FIG. 2 is a schematic flowchart of a time window determination method according to an embodiment of this application. As shown in FIG. 2, the method includes:

Step 201: A terminal determines at least one second time window based on first information and a first time window.

The first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

Optionally, to overcome a disadvantage caused by inability to maintain the uplink transmission with power consistency and phase continuity within the configured DMRS bundling time window (first time window), an actual DMRS bundling time window (second time window) can be obtained through division within the first time window, to ensure that the uplink transmission with power consistency and phase continuity is maintained within the second time window.

Optionally, the first time window may be a configured DMRS bundling time window, and one first time window may include one or more second time windows.

Optionally, the configured DMRS bundling time window may be a configured time domain window.

Optionally, the configured DMRS bundling time window may be a nominal time domain window.

Optionally, the second time window may be an actual DMRS bundling time window, and the UE can maintain the transmission with power consistency and phase continuity within the second time window.

Optionally, the second time window may be a sub DMRS bundling time window (sub-window), and the UE can maintain the transmission with power consistency and phase continuity within the second time window.

Optionally, the first information may indicate an event that may result in inability to maintain power consistency and/or phase continuity.

For example, the first information may be beam switching configuration information, used to instruct the terminal to perform beam switching.

For example, the first information may be configuration information of a physical downlink control channel PDCCH monitoring occasion, used to instruct the terminal to perform PDCCH monitoring on the physical downlink control channel PDCCH monitoring occasion.

For example, the first information may be information related to some transmission gaps, used to indicate transmission gaps.

For example, the first information may be frequency hopping interval information, used to indicate a frequency hopping interval.

For example, the first information may be precoder cycling granularity configuration information, used to indicate a precoder cycling granularity.

For example, the first information may be power adjustment signaling (e.g. transmit power command), used to instruct the terminal to perform a power adjustment.

For example, the first information may be timing advance TA adjustment signaling, used to instruct the terminal to perform a TA adjustment.

Optionally, the terminal may determine, based on the first information, to divide the first time window, and further determine the at least one second time window based on the first time window.

For example, the UE may determine, based on the first information, not to divide the first time window, that is, the first time window does not need to be divided, and further may determine that the first time window coincides with the second time window.

For example, the UE may determine, based on the first information, that a manner of dividing the first time window is division processing, where the division processing may determine one second time window from the first time window. After determining one second time window that can meet the first condition, the UE may further determine, based on a terminal capability and the first information, whether to perform division again within the first time window to obtain a second time window that meets the first condition.

Optionally, the first information may be indicated to the terminal by the network-side device, or determined based on a protocol predefinition, or preset.

Optionally, the transmission that meets the first condition may be a transmission meeting power consistency and phase continuity.

In this embodiment of this application, the terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

Optionally, that a terminal determines at least one second time window based on first information and a first time window includes either of the following:

in a case that the terminal determines, based on the first information, that the first condition is met within the first time window, the terminal determines that the second time window coincides with the first time window; and in a case that the terminal determines, based on the first information, that the first condition is not met within the first time window, the terminal determines the at least one second time window within the first time window.

For example, the UE may determine, based on the first information, that the transmission with power consistency and phase continuity can be maintained within the first time window, further determine that the first time window does not need to be divided, and may determine that the second time window coincides with the first time window.

For example, the UE may determine, based on the first information, that the transmission with power consistency and phase continuity cannot be maintained within the first time window, and further may determine that the first time window needs to be divided at least once, so that the first time window includes one second time window, to ensure that the transmission with power consistency and phase continuity is maintained, that is, the at least one second time window can be determined within the first time window.

Therefore, the terminal can determine, based on the first information, whether the first condition is met within the first time window. If the first condition is met, the terminal can determine that the first time window coincides with the second time window. If the first condition is not met, the terminal can determine the at least one second time window.

Optionally, that the terminal determines the at least one second time window within the first time window in a case that the terminal determines, based on the first information, that the first condition is not met within the first time window includes:

in a case that the terminal determines, based on the first information, that the first condition is not met from a first moment within the first time window, the terminal determines that a 1-st second time window is from a start moment of the first time window to the first moment; and after determining the 1-st second time window, in a case that the terminal is capable of restarting a new second time window after one second time window, the terminal determines all second time windows except the 1-st second time window within the first time window.

For example, in a case that the UE determines that the transmission with power consistency and phase continuity cannot be maintained within the first time window, the UE may determine, based on the first information, that the transmission with power consistency and phase continuity can be maintained within a slot between the start moment of the first time window and the first moment, and may further determine that the 1-st second time window is from the start moment of the first time window to the first moment.

For example, in a case that the UE determines that the transmission with power consistency and phase continuity cannot be maintained within the first time window, if the UE determines, based on the first information, that the UE is incapable of restarting a new second time window after one second time window, the UE may apply new power to an uplink transmission in a time window after the second time window.

For example, in a case that the UE determines that the transmission with power consistency and phase continuity cannot be maintained within the first time window, if the UE determines, based on the first information, that the UE is capable of restarting a new second time window after one second time window, the UE may determine to restart a new second time window after the 1-st second time window.

Therefore, in a case that the terminal determines that the first condition is not met within the first time window, the terminal can determine the 1-st second time window based on the first information, and can further determine all the second time windows except the 1-st second time window.

Optionally, that the terminal determines all second time windows except the 1-st second time window within the first time window in a case that the terminal is capable of restarting a new second time window after one second time window includes:

the terminal determines the at least one second time window, until a last second time window within the first time window and all other second time windows than the 1-st second time window and the last second time window within the first time window are determined, where one of the other second time windows uses a first uplink available slot or symbol after a first event as a start moment and a next first event as an end moment, the last second time window uses a first uplink available slot or symbol after a first event as a start moment and an end moment of the first time window as an end moment, there is no overlap among all the second time windows within the first time window, and the first event is an event indicated by the first information representing that the first condition is not met within the first time window.

Optionally, the first event is an event that causes the first condition not to be met within the first time window.

For example, if the UE determines, based on the first information, that the UE is capable of restarting a new second time window after one second time window, after determining the 1-st second time window, the UE may determine the last second time window by using a first uplink available slot or symbol after a first event as a start moment and the end moment of the first time window as an end moment.

For example, if the UE determines, based on the first information, that the UE is capable of restarting a new second time window after one second time window, and determines, based on the first information, that there is a first event after the 1-st second time window, the UE may determine a plurality of second time windows within the first time window.

In an example, when determining the plurality of second time windows within the first time window, after determining the 1-st second time window, the terminal determines one of the other second time windows by using a first uplink available slot or symbol after a 1-st first event as a start moment and a next first event as an end moment, and so on, thereby determining all the second time windows within the first time window, where the last second time window within the first time window uses a first uplink available slot or symbol after a last first event as a start moment and the end moment of the first time window as an end moment.

In this embodiment of this application, in a case that the terminal is capable of restarting a new second time window after one second time window, the terminal may determine at least one second time window again after determining the 1-st second time window.

Optionally, that the terminal determines, based on the first information, that the first condition is not met within the first time window includes:

in a case that the terminal determines that the terminal receives the first information and that the first information includes first target information, the terminal determines that the first condition is not met within the first time window, where the first target information includes at least one of:

beam switching configuration information;

configuration information of a physical downlink control channel PDCCH monitoring occasion;

information related to a first transmission gap;

frequency hopping interval information;

precoder cycling granularity configuration information;

power adjustment signaling; or timing advance TA adjustment signaling.

Optionally, in a case that the terminal determines that the terminal receives the first information and that the first information includes the first target information, it may be considered that the terminal will perform events indicated by the first target information, and these events will cause inability to maintain the uplink transmission with power consistency and phase continuity. Consequently, demodulation performance of joint channel estimation at the receive end is affected, and the coverage capability is ultimately reduced. Therefore, in a case that the terminal determines that the terminal receives the first information and that the first information includes the first target information, the terminal determines that the first condition is not met within the first time window. In this case, the terminal may determine the at least one second time window within the first time window. In other words, the terminal may divide the first time window into one or more second time windows to ensure that the transmission with power consistency and phase continuity is maintained within the second time window.

Optionally, in a case that the terminal determines that the terminal receives the first information and that the first target information includes the beam switching configuration information, the terminal may determine that the first condition is not met within the first time window.

Optionally, in a case that the terminal determines that the terminal receives the first information and that the first target information includes the configuration information of the physical downlink control channel PDCCH monitoring occasion, the terminal may determine that the first condition is not met within the first time window.

Optionally, when the UE performs PDCCH monitoring within the first time window, if the transmission meeting the first condition cannot be maintained, a PDCCH skipping indication instructs the UE to skip PDCCH monitoring within a period of time. Therefore, if there is an occasion requiring the UE to perform PDCCH monitoring within the first time window, the terminal may determine the at least one second time window within the first time window. In other words, the terminal may divide the first time window into one or more second time windows.

Optionally, in a case that the terminal determines that the terminal receives the first information and that the first target information includes the information related to the first transmission gap, the terminal may determine that the first condition is not met within the first time window. In this case, the terminal may determine the at least one second time window within the first time window. In other words, the terminal may divide the first time window into one or more second time windows.

Optionally, in a case that the terminal determines that the terminal receives the first information and that the first target information includes the frequency hopping interval information, the terminal may determine that the first condition is not met within the first time window. In this case, the terminal may determine the at least one second time window within the first time window. In other words, the terminal may divide the first time window into one or more second time windows.

Optionally, in a case that the terminal determines that the terminal receives the first information and that the first target information includes the precoder cycling granularity configuration information, the terminal may determine that the first condition is not met within the first time window. In this case, the terminal may determine the at least one second time window within the first time window. In other words, the terminal may divide the first time window into one or more second time windows.

Optionally, in a case that the terminal determines that the terminal receives the first information and that the first target information includes the power adjustment signaling, the terminal may determine that the first condition is not met within the first time window. In this case, the terminal may determine the at least one second time window within the first time window. In other words, the terminal may divide the first time window into one or more second time windows.

Optionally, in a case that the terminal determines that the terminal receives the first information and that the first target information includes the timing advance TA adjustment signaling, the terminal may determine that the first condition is not met within the first time window. In this case, the terminal may determine the at least one second time window within the first time window. In other words, the terminal may divide the first time window into one or more second time windows.

Therefore, in a case that the terminal determines that the terminal receives the first information and that the first information includes the first target information, the terminal can determine that the first condition is not met within the first time window, and can further determine the at least one second time window within the first time window.

Optionally, the first transmission gap is determined based on at least one of:

- unscheduled symbols with a quantity exceeding a first threshold;
- first duration greater than a second threshold, where the first duration is duration within which an actual repetition is discarded;
- second duration greater than a third threshold, where the second duration is duration corresponding to a length of an unavailable symbol;
- an uplink transmission symbol, where the uplink transmission symbol is used to transmit an uplink transmission other than a current uplink transmission, and a length of the uplink transmission symbol is not limited to being greater than a length of 13 orthogonal frequency division multiplexing OFDM symbols; or
- a measurement gap.

Optionally, in a case that the terminal determines that the terminal receives the first information and that the first target information includes the information related to the first transmission gap, the terminal may determine, based on the first duration greater than the second threshold, that the first condition is not met within the first time window, and may further determine the at least one second time window within the first time window.

Optionally, in a case that the terminal determines that the terminal receives the first information and that the first target information includes the information related to the first transmission gap, the terminal may determine, based on the second duration greater than the third threshold, that the first condition is not met within the first time window, and may further determine the at least one second time window within the first time window.

Optionally, in a case that the terminal determines that the terminal receives the first information and that the first target information includes the information related to the first transmission gap, the terminal may determine, based on the unscheduled symbols with a quantity exceeding the first threshold, that the first condition is not met within the first time window, and may further determine the at least one second time window within the first time window.

Optionally, in a case that the terminal determines that the terminal receives the first information and that the first target information includes the information related to the first transmission gap, the terminal may determine, based on the uplink transmission symbol, that the first condition is not met within the first time window, and may further determine the at least one second time window within the first time window.

Optionally, in a case that the terminal determines that the terminal receives the first information and that the first target information includes the information related to the first transmission gap, the terminal may determine, based on the measurement gap, that the first condition is not met within the first time window, and may further determine the at least one second time window within the first time window.

Optionally, the transmission gap may be determined based on the duration within which the actual repetition is discarded.

For example, if a nominal repetition corresponds to L>1 in TDRA, when a length of an actual repetition is 1, the actual repetition is discarded.

Optionally, the transmission gap may be determined based on the duration corresponding to the length of the unavailable symbol (invalid symbol).

Optionally, the transmission gap may be determined based on the unscheduled symbols with a quantity exceeding the first threshold.

For example, the first threshold may be the length of 13 orthogonal frequency division multiplexing (OFDM) symbols.

Optionally, the transmission gap may be determined based on the uplink transmission symbol, where the uplink transmission symbol may be used to transmit the uplink transmission other than the current uplink transmission, and the length of the uplink transmission symbol may be not limited to being greater than the length of 13 orthogonal frequency division multiplexing OFDM symbols.

Optionally, the transmission gap may be determined based on the measurement gap.

Optionally, in a case that the duration within which the actual repetition is discarded is greater than the second threshold, the terminal determines that the first condition is not met within the first time window, and may divide the first time window to further determine the at least one second time window.

Optionally, for PUSCH repetition type B, an unavailable symbol pattern (invalid symbol pattern) is configured or dynamically indicated. In a case that duration corresponding to a length of an unavailable symbol determined by the invalid symbol pattern is greater than the third threshold, the terminal may determine that the first condition is not met within the first time window, and further divide the first time window to determine the at least one second time window.

Optionally, the third threshold may be determined based on a predefinition or a preconfiguration.

Optionally, a symbol or slot in a gap defined by the third threshold may be used to transmit other channels or signals.

Optionally, based on the configured measurement gap, the UE may perform corresponding measurement and receive a reference signal. In this case, the UE may determine that the first condition is not met within the first time window, and may further divide the first time window to determine the at least one second time window.

Therefore, in a case that the terminal determines that the terminal receives the first information and that the first information includes the information related to the first transmission gap, the terminal can determine that the first condition is not met within the first time window, and can further determine the at least one second time window within the first time window.

Optionally, the second threshold is determined based on at least one of:

a frequency band of the terminal;

a frequency range of the terminal; or a capability of the terminal.

Optionally, the terminal may determine the second threshold based on the frequency band of the terminal.

Optionally, the terminal may determine the second threshold based on the frequency range of the terminal.

Optionally, the terminal may determine the second threshold based on the capability of the terminal.

For example, in a case that the frequency band of the terminal and the frequency range of the terminal are obtained, the terminal may determine the second threshold based on the frequency band and the frequency range.

For example, in a case that capability information of the UE is obtained, the UE may determine the second threshold based on the capability information.

Optionally, a symbol or slot in a gap defined by the second threshold does not transmit other channels or signals.

Optionally, the second threshold may be 13 symbols.

Therefore, the terminal can determine the second threshold based on the frequency band, frequency range, or capability of the terminal.

Optionally, the beam switching configuration information includes cyclic mapping pattern configuration information.

In a case that the beam switching configuration information includes the cyclic mapping pattern configuration information, the cyclic mapping pattern configuration information is not used for beam switching for an uplink transmission configured with joint channel estimation.

Optionally, in a case that the beam switching configuration information includes the cyclic mapping pattern configuration information, the cyclic mapping pattern may be that beam switching is performed once per 1 slot, or may be that beam switching is performed once per 1 repetition.

Optionally, in a case that the beam switching configuration information includes the cyclic mapping pattern configuration information, the cyclic mapping pattern configuration information is not used for beam switching for an uplink transmission configured with joint channel estimation.

Optionally, the beam switching configuration information includes sequential mapping pattern configuration information.

In a case that the beam switching configuration information includes the sequential mapping pattern configuration information, if the sequential mapping pattern configuration information is used for beam switching for an uplink transmission configured with joint channel estimation, the number of continuous repetitions or continuous slots that use a same beam in the uplink transmission configured with joint channel estimation is X, where X is greater than or equal to N and X is less than or equal to a configured length of the first time window, and N is the number of continuous repetitions or continuous slots that use a same beam as indicated by the sequential mapping pattern configuration information.

Optionally, in a case that the beam switching configuration information includes the sequential mapping pattern configuration information, the sequential mapping pattern may be that beam switching is performed once per 2 slots, or may be that beam switching is performed once per 2 repetitions.

Optionally, if the transmission that meets the first condition cannot be maintained when the UE performs beam switching within the first time window, a time point of beam switching is the determined end moment of the second time window.

Optionally, X may be the number of continuous repetitions or continuous slots that use the same beam as indicated by the cyclic mapping pattern configuration information.

Optionally, N may be the number of continuous repetitions or continuous slots that use the same beam as indicated by the sequential mapping pattern configuration information.

Optionally, a value range of X may be: X is greater than or equal to N and X is less than or equal to the configured length of the first time window (length of configured TDW).

For example, N may be 2 in a case that the sequential mapping pattern is that beam switching is performed once per 2 slots.

For example, N may be 2 in a case that the sequential mapping pattern is that beam switching is performed once per 2 repetitions.

Optionally, if the sequential mapping pattern configuration information is used for beam switching for the uplink transmission configured with joint channel estimation, the number of continuous repetitions or continuous slots that use the same beam in the uplink transmission configured with joint channel estimation may be set to X.

Optionally, that a terminal determines at least one second time window based on first information and a first time window includes:

the terminal determines that a moment of frequency hopping position switching indicated by the frequency hopping interval information is an end moment of the second time window.

Optionally, if a frequency hopping transmission is enabled within the first time window, the terminal may determine that a time point of frequency hopping position switching is the end moment of the second time window.

Optionally, frequency hopping may include intra-slot frequency hopping, inter-slot frequency hopping, or inter repetition frequency hopping.

Optionally, frequency hopping may include inter-slot bundling frequency hopping.

Optionally, that a terminal determines at least one second time window based on first information and a first time window includes:

the terminal determines that a moment of precoder switching indicated by the precoder cycling granularity configuration information is an end moment of the second time window.

Optionally, if precoder cycling is enabled within the first time window, the terminal may determine that a time point of precoder switching (precoder) is the end moment of the second time window.

Optionally, in a case that the first information includes the power adjustment signaling, if the terminal is capable of restarting a new second time window after one second time window, the method further includes any one of the following:

the terminal applies new power to an uplink transmission in the new second time window and a time window after the new second time window;

before the uplink transmission ends, the terminal performs no power adjustment; and the terminal determines, based on the capability of the terminal, whether to perform a power adjustment.

Optionally, in a case that the first information includes the power adjustment signaling, if the terminal is capable of restarting a new second time window (restart DMRS bundling) after one second time window, the UE may perform no power adjustment before the uplink transmission ends.

Optionally, in a case that the first information includes the power adjustment signaling, if the UE is capable of restarting a new second time window after one second time window, the UE may apply new power to an uplink transmission in the new second time window and a time window after the new second time window.

Optionally, if the terminal is incapable of restarting a new second time window (restart DMRS bundling) after one second time window, the terminal applies new power to an uplink transmission in the new second time window and a time window after the new second time window.

Optionally, in a case that the first information includes the TA adjustment signaling, if the terminal is capable of restarting a new second time window after one second time window, the method further includes any one of the following:

the terminal applies a new TA to an uplink transmission in the new second time window and a time window after the new second time window;

before the uplink transmission ends, the terminal performs no TA adjustment; and the terminal determines, based on the capability of the terminal, whether to perform a TA adjustment.

For example, in a case that the first information includes the TA adjustment signaling, if the UE is capable of restarting a new second time window (restart DMRS bundling) after one second time window, the UE may perform no TA adjustment before the uplink transmission ends.

For example, in a case that the first information includes the TA adjustment signaling, if the UE is capable of restarting a new second time window after one second time window, the UE may apply a new TA to an uplink transmission in the new second time window and a time window after the new second time window.

Optionally, if the terminal is incapable of restarting a new second time window (restart DMRS bundling) after one second time window, the terminal applies a new TA to an uplink transmission in the new second time window and a time window after the new second time window.

Optionally, that the terminal determines, based on the first information, that the first condition is met within the first time window includes:

in a case that the terminal determines that the terminal does not receive the first information or in a case that the terminal determines that the terminal receives the first information and that the first information includes second target information, the terminal determines that the first condition is met within the first time window, where the second target information includes at least one of:

configuration information of a physical downlink control channel PDCCH monitoring occasion and information indicating that a second event occurs, where the second event is an event that the terminal does not perform PDCCH monitoring on the PDCCH monitoring occasion configured in the configuration information of the PDCCH monitoring occasion; or information related to a second transmission gap.

Optionally, in a case that the terminal determines that the terminal does not receive the first information, it may be considered that the terminal is not instructed to perform some events that cause inability to maintain the uplink transmission with power consistency and phase continuity. In this case, the terminal may determine that the first condition is met within the first time window, and may determine not to perform division processing on the first time window, that is, the second time window coincides with the first time window.

Optionally, in a case that the terminal determines that the terminal receives the first information and that the first information includes the second target information, the second target information is used to represent that the terminal does not perform an event indicated by the first information and causing inability to maintain the uplink transmission with power consistency and phase continuity or that there is no impact on maintenance of the uplink transmission with power consistency and phase continuity. In this case, the terminal may determine that the first condition is met within the first time window, and may determine not to perform division processing on the first time window, that is, the second time window coincides with the first time window.

Optionally, in a case that the terminal determines that the terminal does not receive the first information, the terminal may determine that the first condition is met within the first time window, and may further determine that the first time window coincides with the second time window.

Optionally, in a case that the terminal determines that the terminal receives the first information and that the second target information includes the configuration information of the physical downlink control channel PDCCH monitoring occasion and the information indicating that the second event occurs, the terminal may determine that the first condition is met within the first time window, and may further determine that the first time window coincides with the second time window.

Optionally, in a case that the terminal determines that the terminal receives the first information and that the second target information includes the information related to the second transmission gap, the terminal may determine that the first condition is met within the first time window, and may further determine that the first time window coincides with the second time window.

Therefore, in a case that the terminal determines that the terminal does not receive the first information, the terminal can determine that the first condition is met within the first time window, and can further determine that the first time window coincides with the second time window; or in a case that the terminal determines that the terminal receives the first information and that the first information includes the second target information, the terminal can determine that the first condition is met within the first time window, and can further determine that the first time window coincides with the second time window.

Optionally, the second transmission gap is determined based on at least one of:

first duration less than or equal to the second threshold, where the first duration is duration within which an actual repetition is discarded; or second duration less than or equal to the third threshold, where the second duration is duration corresponding to a length of an unavailable symbol.

Optionally, in a case that the duration within which the actual repetition is discarded is less than or equal to the second threshold, the terminal may determine that the first condition may be met within the first time window, and may continue to maintain the transmission meeting the first condition within the first time window, and may not divide the first time window, that is, determine that the first time window coincides with the second time window.

For PUSCH repetition type B, an unavailable symbol pattern (invalid symbol pattern) is configured or dynamically indicated. In a case that duration corresponding to a length of an unavailable symbol determined by the invalid symbol pattern is less than or equal to the third threshold, the terminal may continue to maintain the transmission meeting the first condition within the first time window, and may not divide the first time window, that is, determine that the first time window coincides with the second time window.

Optionally, the second event includes at least one of:

the terminal is within a discontinuous reception inactive (DRX off) time; or the terminal receives first signaling, where the first signaling is used to instruct the terminal not to perform PDCCH monitoring.

Optionally, the second event may be an event that the terminal does not perform PDCCH monitoring on the PDCCH monitoring occasion configured in the configuration information of the physical downlink control channel (PDCCH) monitoring occasion.

Optionally, the second event may be that the terminal is within the discontinuous reception inactive (DRX off) time.

Optionally, the second event may be that the terminal receives the first signaling, where the first signaling is used to instruct the terminal not to perform PDCCH monitoring.

For example, the first signaling may be a PDCCH skipping indication, used to indicate a behavior that the UE skips PDCCH monitoring within certain duration and resumes PDCCH monitoring after the duration ends.

Optionally, in a case that the first information includes the configuration information of the PDCCH monitoring occasion, if the second event occurs, the terminal may determine that the second time window coincides with the first time window.

Optionally, the first information is determined in at least one of the following manners:

preconfigured;

determined based on radio resource control (RRC) signalling;

determined based on a media access control control element (MAC CE);

determined based on a configured grant; or determined based on downlink control information (DCI).

Optionally, the terminal may determine the first information based on a preconfiguration.

Optionally, the terminal may determine the first information based on radio resource control (RRC) signalling.

Optionally, the terminal may determine the first information based on the media access control control element (MAC CE).

Optionally, the terminal may determine the first information based on the configured grant.

Optionally, the terminal may determine the first information based on the downlink control information (DCI).

Figure 3:
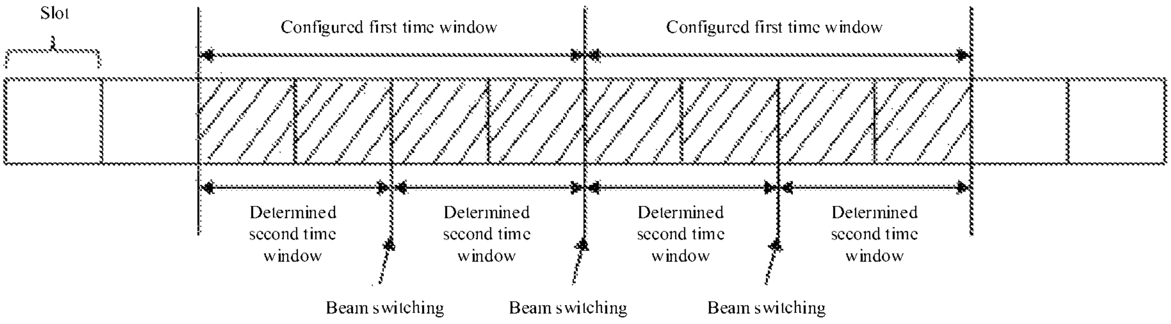
FIG. 3 is a first schematic diagram of a determined second time window according to an embodiment of this application.

FIG. 3 is a first schematic diagram of a determined second time window according to an embodiment of this application. As shown in FIG. 3, for PUSCH repetition type A, if a sequential mapping pattern is configured for beam switching, beam switching is performed per 2 slots. As shown in FIG. 3, in a frequency division duplex (FDD) system, UE may divide a first time window into a plurality of second time windows.

Figure 4:
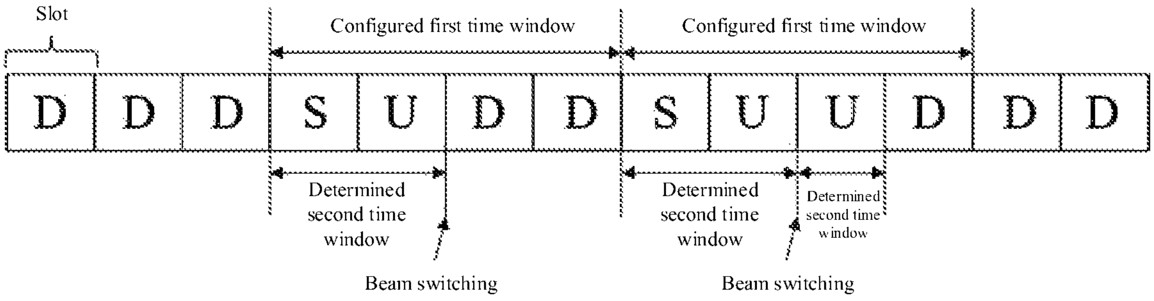
FIG. 4 is a second schematic diagram of a determined second time window according to an embodiment of this application.

FIG. 4 is a second schematic diagram of a determined second time window according to an embodiment of this application. As shown in FIG. 4, in FIG. 4, D represents a downlink slot, S represents a special slot, and U represents an uplink slot. For PUSCH repetition type A, if a sequential mapping pattern is configured for beam switching, beam switching is performed per 2 slots. As shown in FIG. 4, in a time division duplex (TDD) system, UE may divide a first time window into at least one second time window.

Figure 5:
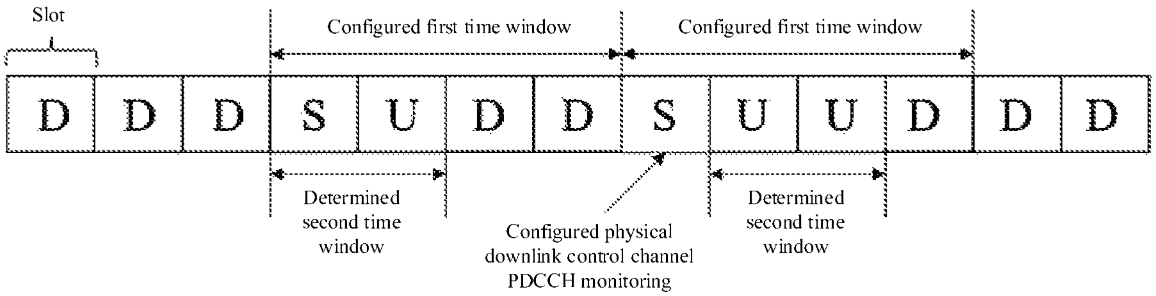
FIG. 5 is a third schematic diagram of a determined second time window according to an embodiment of this application.

FIG. 5 is a third schematic diagram of a determined second time window according to an embodiment of this application. As shown in FIG. 5, in FIG. 5, D represents a downlink slot, S represents a special slot, and U represents an uplink slot. For a PUSCH repetition in a TDD system, assuming that a second special slot in FIG. 5 is configured with PDCCH monitoring (Configured PDCCH monitoring), if duration without a PDCCH skipping indication or not configured with a PDCCH skipping indication does not include a configured PDCCH monitoring occasion, UE needs to perform PDCCH monitoring within the special slot. The special slot cannot be used for the PUSCH repetition transmission, and a transmission that meets a first condition cannot be maintained either. Therefore, the determined second time window cannot include the special slot.

Figure 6:
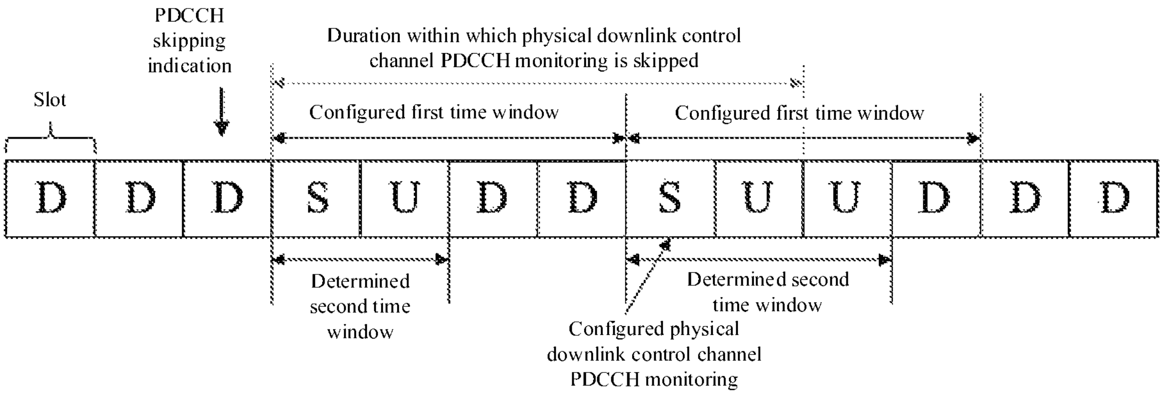
FIG. 6 is a fourth schematic diagram of a determined second time window according to an embodiment of this application.

FIG. 6 is a fourth schematic diagram of a determined second time window according to an embodiment of this application. As shown in FIG. 6, in FIG. 6, D represents a downlink slot, S represents a special slot, and U represents an uplink slot. For a PUSCH repetition in a TDD system, assuming that a second special slot in FIG. 6 is configured with PDCCH monitoring (Configured PDCCH monitoring), if UE receives a PDCCH skipping indication, and duration within which no PDCCH monitoring is performed (No PDCCH monitoring duration) that is indicated by the PDCCH skipping indication includes a configured PDCCH monitoring occasion, the UE does not perform PDCCH monitoring within the special slot. Therefore, the determined second time window can include the special slot.

Figure 7:
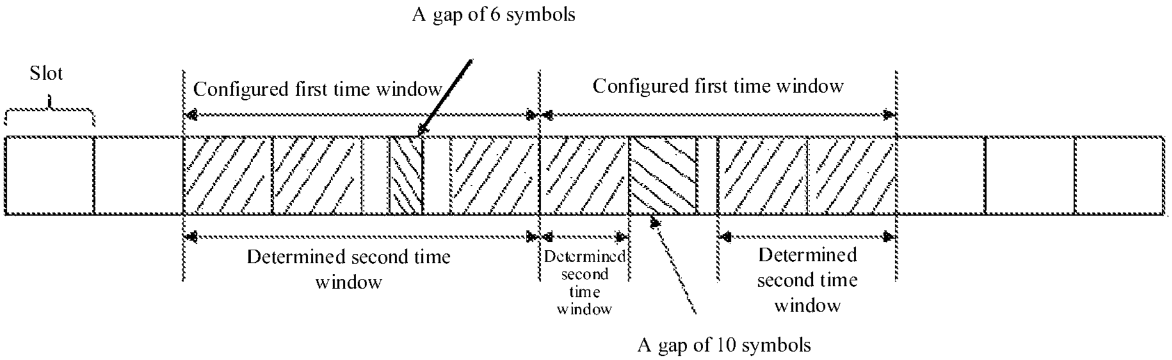
FIG. 7 is a fifth schematic diagram of a determined second time window according to an embodiment of this application.

FIG. 7 is a fifth schematic diagram of a determined second time window according to an embodiment of this application. As shown in FIG. 7, if a maximum gap in which power consistency and phase continuity can be maintained as specified in a frequency band is 8 symbols, or a maximum gap in which current UE can maintain power consistency and phase continuity is 8 symbols, assuming that the UE performs a PUSCH transmission for which DMRS bundling is enabled in the frequency band, where a transmission gap with a length of 6 symbols and a transmission gap with a length of 10 symbols exist, for the transmission gap with the length of 6 symbols, the UE may determine not to divide a first time window, but for the transmission gap with the length of 10 symbols, the UE may determine to divide the first time window to further determine at least one second time window.

Figure 8:
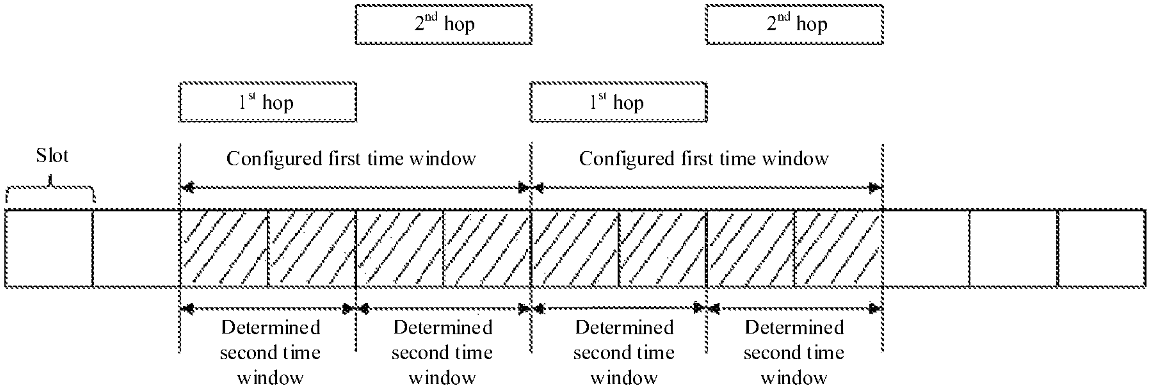
FIG. 8 is a sixth schematic diagram of a determined second time window according to an embodiment of this application.

FIG. 8 is a sixth schematic diagram of a determined second time window according to an embodiment of this application. As shown in FIG. 8, if UE performs a PUSCH transmission for which DMRS bundling is enabled, and a frequency hopping interval configured by a network is 2 slots, the determined second time window is shown in FIG. 8, where a 1-st hop indicates a first hop of the frequency hopping interval configured by the network, and a $2^{nd}$ hop indicates a second hop of the frequency hopping interval configured by the network.

In the embodiments of this application, the terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

It should be noted that the time window determination method provided in the embodiments of this application may be performed by a time window determination apparatus or a control module for performing the time window determination method in the time window determination apparatus. A time window determination apparatus provided in the embodiments of this application is described by assuming that the time window determination method in the embodiments of this application is performed by the time window determination apparatus.

Figure 9:
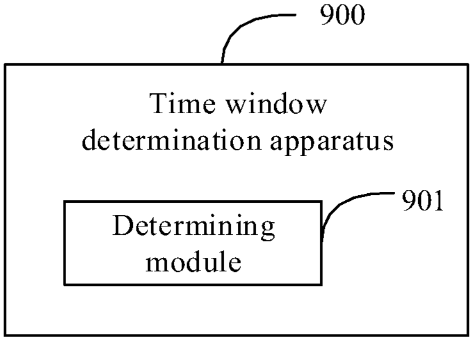
FIG. 9 is a schematic diagram of a structure of a time window determination apparatus according to an embodiment of this application.

FIG. 9 is a schematic diagram of a structure of a time window determination apparatus according to an embodiment of this application. As shown in FIG. 9, the time window determination apparatus 900 includes a determining module 901.

The determining module 901 is configured to determine at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

Optionally, the apparatus may determine the at least one second time window based on the first information and the first time window, where the second time window is the actual DMRS bundling time window, and the uplink transmission meets "maintaining power consistency and phase continuity" within the actual DMRS bundling time window.

In this embodiment of this application, a terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

Optionally, the determining module is further configured to:

in a case that it is determined, based on the first information, that the first condition is met within the first time window, determine that the second time window coincides with the first time window; and in a case that it is determined, based on the first information, that the first condition is not met within the first time window, determine the at least one second time window within the first time window.

Optionally, the determining module is further configured to:

in a case that it is determined, based on the first information, that the first condition is not met from a first moment within the first time window, determine that a 1-st second time window is from a start moment of the first time window to the first moment; and after determining the 1-st second time window, in a case that a terminal is capable of restarting a new second time window after one second time window, determine all second time windows except the 1-st second time window within the first time window.

Optionally, the determining module is further configured to:

in the case of being capable of restarting a new second time window after one second time window, determine the at least one second time window, until a last second time window within the first time window and all other second time windows than the 1-st second time window and the last second time window within the first time window are determined, where one of the other second time windows uses a first uplink available slot or symbol after a first event as a start moment and a next first event as an end moment, the last second time window uses a first uplink available slot or symbol after a first event as a start moment and an end moment of the first time window as an end moment, there is no overlap among all the second time windows within the first time window, and the first event is an event indicated by the first information representing that the first condition is not met within the first time window.

Optionally, the determining module is further configured to:

in a case that it is determined that the terminal receives the first information and that the first information includes first target information, determine that the first condition is not met within the first time window, where the first target information includes at least one of:

beam switching configuration information;

configuration information of a physical downlink control channel PDCCH monitoring occasion;

information related to a first transmission gap;

frequency hopping interval information;

precoder cycling granularity configuration information;

power adjustment signaling; or timing advance TA adjustment signaling.

Optionally, the first transmission gap is determined based on at least one of:

an unscheduled symbols with a quantity exceeding a first threshold;

first duration greater than a second threshold, where the first duration is duration within which an actual repetition is discarded;

second duration greater than a third threshold, where the second duration is duration corresponding to a length of an unavailable symbol;

an uplink transmission symbol, where the uplink transmission symbol is used to transmit an uplink transmission other than a current uplink transmission, and a length of the uplink transmission symbol is not limited to being greater than a length of 13 orthogonal frequency division multiplexing OFDM symbols; or a measurement gap.

Optionally, the second threshold is determined based on at least one of:

a frequency band of the terminal;

a frequency range of the terminal; or a capability of the terminal.

Optionally, the beam switching configuration information includes cyclic mapping pattern configuration information, where in a case that the beam switching configuration information includes the cyclic mapping pattern configuration information, the cyclic mapping pattern configuration information is not used for beam switching for an uplink transmission configured with joint channel estimation.

Optionally, the beam switching configuration information includes sequential mapping pattern configuration information, where in a case that the beam switching configuration information includes the sequential mapping pattern configuration information, if the sequential mapping pattern configuration information is used for beam switching for an uplink transmission configured with joint channel estimation, the number of continuous repetitions or continuous slots that use a same beam in the uplink transmission configured with joint channel estimation is X, where X is greater than or equal to N and X is less than or equal to a configured length of the first time window, and N is the number of continuous repetitions or continuous slots that use a same beam as indicated by the sequential mapping pattern configuration information.

Optionally, the determining module is further configured to:

determine that a moment of frequency hopping position switching indicated by the frequency hopping interval information is an end moment of the second time window.

Optionally, the determining module is further configured to:

determine that a moment of precoder switching indicated by the precoder cycling granularity configuration information is an end moment of the second time window.

Optionally, in a case that the first information includes the power adjustment signaling, if the terminal is capable of restarting a new second time window after one second time window, the apparatus further includes any one of the following:

a first transmission module, configured to apply new power to an uplink transmission in the new second time window and a time window after the new second time window;

a first adjustment module, configured to perform no power adjustment before the uplink transmission ends; and a second adjustment module, configured to determine, based on the capability of the terminal, whether to perform a power adjustment.

Optionally, in a case that the first information includes the TA adjustment signaling, if the terminal is capable of restarting a new second time window after one second time window, the apparatus further includes any one of the following:

a second transmission module, configured to apply a new TA to an uplink transmission in the new second time window and a time window after the new second time window;

a third adjustment module, configured to perform no TA adjustment before the uplink transmission ends; and a fourth adjustment module, configured to determine, based on the capability of the terminal, whether to perform a TA adjustment.

Optionally, the determining module is further configured to:

in a case that it is determined that the terminal does not receive the first information or in a case that it is determined that the terminal receives the first information and that the first information includes second target information, determine that the first condition is met within the first time window, where the second target information includes at least one of:

configuration information of a physical downlink control channel PDCCH monitoring occasion and information indicating that a second event occurs, where the second event is an event that the terminal does not perform PDCCH monitoring on the PDCCH monitoring occasion configured in the configuration information of the PDCCH monitoring occasion; or information related to a second transmission gap.

Optionally, the second transmission gap is determined based on at least one of:

first duration less than or equal to the second threshold, where the first duration is duration within which an actual repetition is discarded; or second duration less than or equal to the third threshold, where the second duration is duration corresponding to a length of an unavailable symbol.

Optionally, the second event includes at least one of:

the terminal is within a discontinuous reception inactive (DRX off) time; or the terminal receives first signaling, where the first signaling is used to instruct the terminal not to perform PDCCH monitoring.

Optionally, the first information is determined in at least one of the following manners:

preconfigured;

determined based on radio resource control (RRC) signalling;

determined based on a media access control control element (MAC CE);

determined based on a configured grant; or determined based on downlink control information (DCI).

In this embodiment of this application, the terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

The time window determination apparatus in this embodiment of this application may be an apparatus, or an apparatus or an electronic device with an operating system, or may be a component, an integrated circuit, or a chip in the terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The time window determination apparatus provided in this embodiment of this application can implement each process implemented by the method embodiments in FIG. 2 to FIG. 8, with the same technical effect achieved. To avoid repetition, details are not described herein again.

Figure 10:
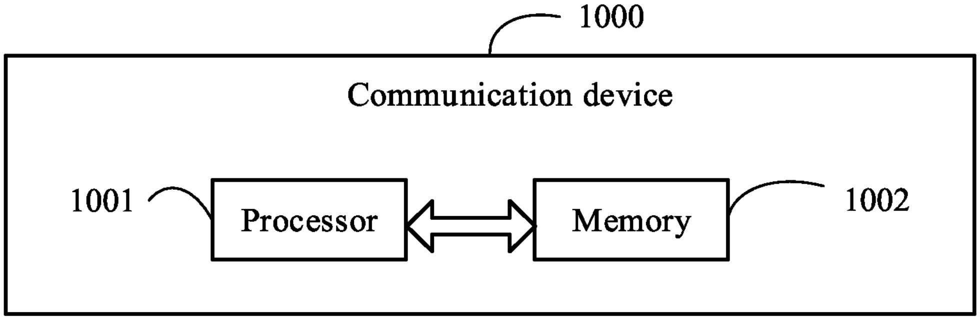
FIG. 10 is a schematic diagram of a structure of a communication device according to an embodiment of this application.

Optionally, FIG. 10 is a schematic diagram of a structure of a communication device according to an embodiment of this application. As shown in FIG. 10, an embodiment of this application further provides a communication device 1000, including a processor 1001, a memory 1002, and a program or instructions stored in the memory 1002 and executable on the processor 1001. For example, when the communication device 1000 is a terminal, and the program or instructions are executed by the processor 1001, each process of the foregoing embodiment of the time window determination method is implemented, with the same technical effect achieved.

An embodiment of this application further provides a terminal, including a processor and a communication interface. The processor is configured to:

determine at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

Figure 11:
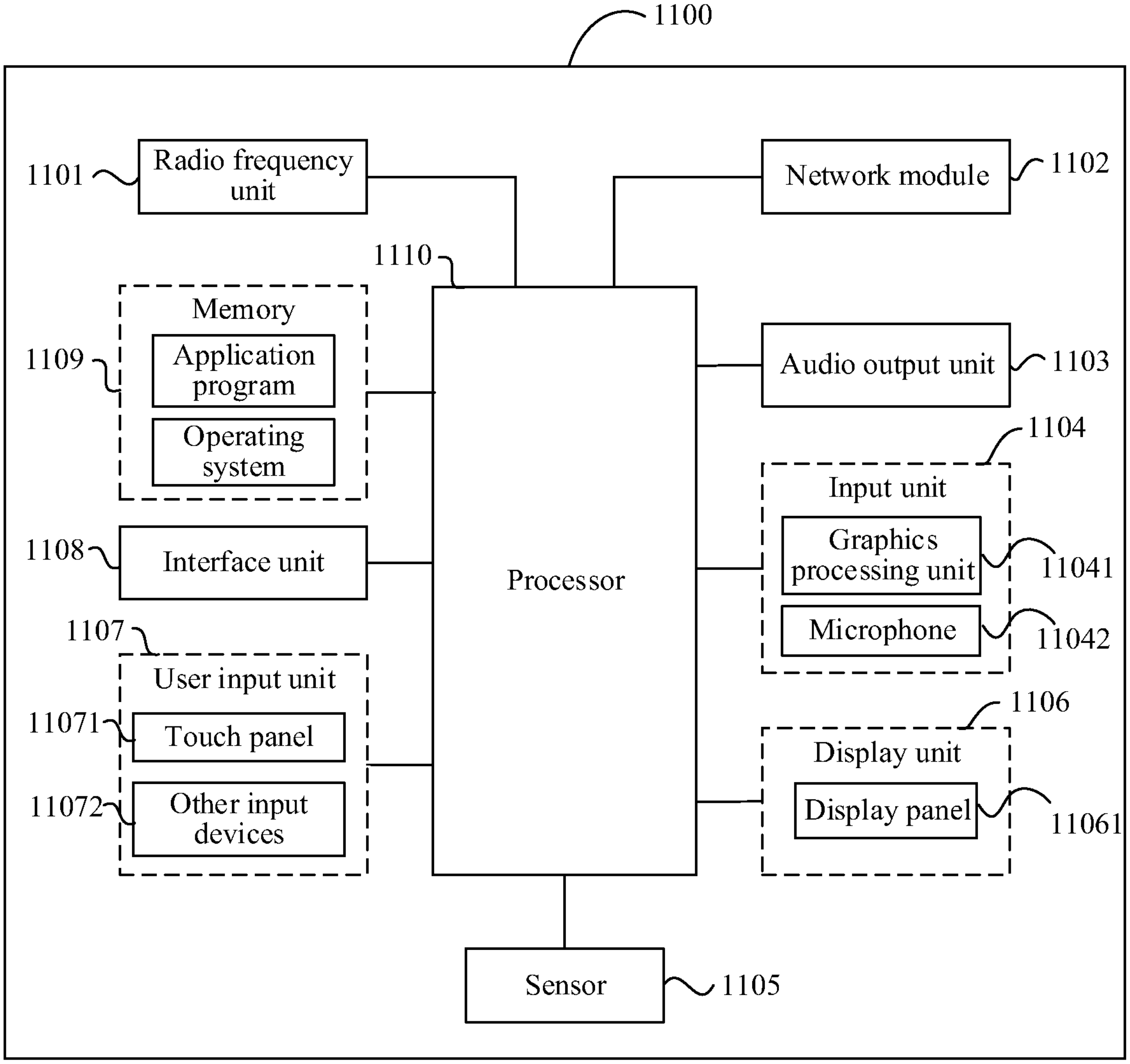
FIG. 11 is a schematic diagram of a hardware structure of a terminal for implementing an embodiment of this application.

The terminal embodiment corresponds to the foregoing terminal-side method embodiment, and each implementation process and implementation of the foregoing method embodiment can be applied to the terminal embodiment, with the same technical effect achieved. FIG. 11 is a schematic diagram of a hardware structure of a terminal for implementing an embodiment of this application.

The terminal 1100 includes but is not limited to at least some components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (for example, a battery) supplying power to all components. Optionally, the power supply may be logically connected to the processor 1110 through a power management system. In this way, functions such as charge management, discharge management, and power consumption management are implemented by using the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1101 sends the downlink data to the processor 1110 for processing, and in addition, sends uplink data to the network-side device. Generally, the radio frequency unit 1101 includes but is not limited to an antenna, at least one amplifier, a transceiver, a coupler, a low noise amplifier, a duplexer, and the like.

The memory 1109 may be configured to store software programs or instructions and various data. The memory 1109 may primarily include a program or instruction storage area and a data storage area. The program or instruction storage area may store an operating system, an application program or instructions (such as an audio play function and an image play function) required by at least one function, and the like. In addition, the memory 1109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 1110 may include one or more processing units. Optionally, the processor 1110 may integrate an application processor and a modem processor. The application processor mainly processes the operating system, a user interface, an application program or an instruction, and the like. The modem processor mainly processes wireless communication. For example, the modem processor is a baseband processor. It may be understood that the modem processor may alternatively not be integrated in the processor 1110.

The processor 1110 is configured to:

determine at least one second time window based on first information and a first time window, where the first time window is a configured DMRS bundling time window, the second time window is an actual DMRS bundling time window, an uplink transmission within the actual DMRS bundling time window is a transmission that meets a first condition, and the first condition includes maintaining power consistency and phase continuity.

In this embodiment of this application, the terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

Optionally, the processor 1110 is further configured to perform at least one of:

in a case that the terminal determines, based on the first information, that the first condition is met within the first time window, determining that the second time window coincides with the first time window; or in a case that the terminal determines, based on the first information, that the first condition is not met within the first time window, determining the at least one second time window within the first time window.

Optionally, the processor 1110 is further configured to:

in a case that the terminal determines, based on the first information, that the first condition is not met from a first moment within the first time window, determine that a 1-st second time window is from a start moment of the first time window to the first moment; and after determining the 1-st second time window, in a case that a terminal is capable of restarting a new second time window after one second time window, determine all second time windows except the 1-st second time window within the first time window.

Optionally, the processor 1110 is further configured to:

in the case that the terminal is capable of restarting a new second time window after one second time window, determine the at least one second time window, until a last second time window within the first time window and all other second time windows than the 1-st second time window and the last second time window within the first time window are determined, where one of the other second time windows uses a first uplink available slot or symbol after a first event as a start moment and a next first event as an end moment, the last second time window uses a first uplink available slot or symbol after a first event as a start moment and an end moment of the first time window as an end moment, there is no overlap among all the second time windows within the first time window, and the first event is an event indicated by the first information representing that the first condition is not met within the first time window.

Optionally, the processor 1110 is further configured to:

in a case that the terminal determines that the terminal receives the first information and that the first information includes first target information, determine that the first condition is not met within the first time window, where the first target information includes at least one of:

beam switching configuration information;

configuration information of a physical downlink control channel PDCCH monitoring occasion;

information related to a first transmission gap;

frequency hopping interval information;

precoder cycling granularity configuration information;

power adjustment signaling; or timing advance TA adjustment signaling.

Optionally, the first transmission gap is determined based on at least one of:

an unscheduled symbols with a quantity exceeding a first threshold;

first duration greater than a second threshold, where the first duration is duration within which an actual repetition is discarded;

second duration greater than a third threshold, where the second duration is duration corresponding to a length of an unavailable symbol;

an uplink transmission symbol, where the uplink transmission symbol is used to transmit an uplink transmission other than a current uplink transmission, and a length of the uplink transmission symbol is not limited to being greater than a length of 13 orthogonal frequency division multiplexing OFDM symbols; or a measurement gap.

Optionally, the second threshold is determined based on at least one of:

a frequency band of the terminal;

a frequency range of the terminal; or a capability of the terminal.

Optionally, the beam switching configuration information includes cyclic mapping pattern configuration information, where in a case that the beam switching configuration information includes the cyclic mapping pattern configuration information, the cyclic mapping pattern configuration information is not used for beam switching for an uplink transmission configured with joint channel estimation.

Optionally, the beam switching configuration information includes sequential mapping pattern configuration information, where in a case that the beam switching configuration information includes the sequential mapping pattern configuration information, if the sequential mapping pattern configuration information is used for beam switching for an uplink transmission configured with joint channel estimation, the number of continuous repetitions or continuous slots that use a same beam in the uplink transmission configured with joint channel estimation is X, where X is greater than or equal to N and X is less than or equal to a configured length of the first time window, and N is the number of continuous repetitions or continuous slots that use a same beam as indicated by the sequential mapping pattern configuration information.

Optionally, the processor 1110 is further configured to:

determine that a moment of frequency hopping position switching indicated by the frequency hopping interval information is an end moment of the second time window.

Optionally, the processor 1110 is further configured to:

determine that a moment of precoder switching indicated by the precoder cycling granularity configuration information is an end moment of the second time window.

Optionally, in a case that the first information includes the power adjustment signaling, if the terminal is capable of restarting a new second time window after one second time window, the processor 1110 is further configured to perform any one of the following:

applying new power to an uplink transmission in the new second time window and a time window after the new second time window;

before the uplink transmission ends, performing no power adjustment; and determining, based on the capability of the terminal, whether to perform a power adjustment.

Optionally, in a case that the first information includes the TA adjustment signaling, if the terminal is capable of restarting a new second time window after one second time window, the processor 1110 is further configured to perform any one of the following:

applying a new TA to an uplink transmission in the new second time window and a time window after the new second time window;

before the uplink transmission ends, performing no TA adjustment; and determining, based on the capability of the terminal, whether to perform a TA adjustment.

Optionally, the processor 1110 is further configured to:

in a case that the terminal determines that the terminal does not receive the first information or in a case that the terminal determines that the terminal receives the first information and that the first information includes second target information, determine that the first condition is met within the first time window, where the second target information includes at least one of:

configuration information of a physical downlink control channel PDCCH monitoring occasion and information indicating that a second event occurs, where the second event is an event that the terminal does not perform PDCCH monitoring on the PDCCH monitoring occasion configured in the configuration information of the PDCCH monitoring occasion; or information related to a second transmission gap.

Optionally, the second transmission gap is determined based on at least one of:

first duration less than or equal to the second threshold, where the first duration is duration within which an actual repetition is discarded; or second duration less than or equal to the third threshold, where the second duration is duration corresponding to a length of an unavailable symbol.

Optionally, the second event includes at least one of:

the terminal is within a discontinuous reception inactive (DRX off) time; or the terminal receives first signaling, where the first signaling is used to instruct the terminal not to perform PDCCH monitoring.

Optionally, the first information is determined in at least one of the following manners:

preconfigured;

determined based on radio resource control (RRC) signalling;

determined based on a media access control control element (MAC CE);

determined based on a configured grant; or determined based on downlink control information (DCI).

In this embodiment of this application, the terminal can determine the at least one second time window based on the first information and the first time window, where the second time window is the actual DMRS bundling time window, thereby ensuring that even if some configurations or signaling makes an uplink resource unavailable, the uplink transmission can still meet "maintaining power consistency and phase continuity" within the actual DMRS bundling time window. This further facilitates joint channel estimation at a receive end based on the second time window, improves accuracy of channel estimation, and improves a coverage capability.

An embodiment of this application further provides a non-transitory readable storage medium. The non-transitory readable storage medium stores a program or instructions. When the program or instructions are executed by a processor, each process of the foregoing embodiment of the time window determination method is implemented, with the same technical effect achieved. To avoid repetition, details are not described herein again.

The processor is a processor in the terminal in the foregoing embodiment. The non-transitory readable storage medium includes a non-transitory computer readable storage medium, for example, a computer read-only memory (ROM), a random access memory (RAM), a magnetic disk, or an optical disc.

In addition, an embodiment of this application provides a chip, where the chip includes a processor and a communication interface, the communication interface is coupled to the processor, and the processor is configured to run a program or instructions to implement each process of the foregoing embodiment of the time window determination method, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application further provides a computer program or program product. The computer program or program product is stored in a non-transitory storage medium. The program or program product is executed by at least one processor to implement each process of the foregoing embodiment of the time window determination method, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A time window determination method, comprising:

determining, by a terminal, at least one second time window based on first information and a first time window, wherein the first time window is a configured demodulation reference signal (DMRS) bundling time window, the second time window is an actual DMRS bundling time window, an uplink transmission within the actual DMRS bundling time window is a transmission that meets a first condition, and the first condition comprises maintaining power consistency and phase continuity;

wherein the determining, by the terminal, the at least one second time window based on the first information and the first time window comprises:

after the terminal determines that the first information is received, determining, by the terminal, that the first condition is not met within the first time window; and determining, by the terminal, the at least one second time window within the first time window;

wherein the first information comprises first target information, and the first target information comprises at least one of:

beam switching configuration information;

configuration information of a physical downlink control channel (PDCCH) monitoring occasion; or information related to a first transmission gap; and wherein the first transmission gap is determined based on at least one of:

unscheduled symbols with a quantity exceeding a first threshold; or an uplink transmission symbol, wherein the uplink transmission symbol is used to transmit an uplink transmission other than a current uplink transmission, and a length of the uplink transmission symbol is not limited to being greater than a length of 13 orthogonal frequency division multiplexing (OFDM) symbols.

2. The time window determination method according to claim 1, wherein the determining, by the terminal, the at least one second time window within the first time window comprises:

determining, by the terminal, that a 1-st second time window is from a start moment of the first time window to the first moment; and after determining the 1-st second time window, in a case that the terminal is capable of restarting a new second time window after one second time window, determining all second time windows except the 1-st second time window within the first time window.

3. The time window determination method according to claim 2, wherein the determining all second time windows except the 1-st second time window within the first time window in a case that the terminal is capable of restarting a new second time window after one second time window comprises:

determining, by the terminal, the at least one second time window, until a last second time window within the first time window and all other second time windows than the 1-st second time window and the last second time window within the first time window are determined, wherein one of the other second time windows uses a first uplink available slot or symbol after a first event as a start moment and a next first event as an end moment, the last second time window uses a first uplink available slot or symbol after a first event as a start moment and an end moment of the first time window as an end moment, there is no overlap among all the second time windows within the first time window, and the first event is an event indicated by the first information representing that the first condition is not met within the first time window.

4. The time window determination method according to claim 1, wherein the first target information further comprises at least one of:

frequency hopping interval information;

precoder cycling granularity configuration information;

power adjustment signaling; or timing advance (TA) adjustment signaling.

5. The time window determination method according to claim 4, wherein the determining, by the terminal, the at least one second time window based on the first information and the first time window comprises:

determining, by the terminal, that a moment of frequency hopping position switching indicated by the frequency hopping interval information is an end moment of the second time window; or determining, by the terminal, that a moment of precoder switching indicated by the precoder cycling granularity configuration information is an end moment of the second time window.

6. The time window determination method according to claim 4, wherein in a case that the first information comprises the power adjustment signaling, if the terminal is capable of restarting a new second time window after one second time window, the method further comprises any one of the following:

applying, by the terminal, new power to an uplink transmission in the new second time window and a time window after the new second time window;

before the uplink transmission ends, performing, by the terminal, no power adjustment; and determining, by the terminal based on the capability of the terminal, whether to perform a power adjustment.

7. The time window determination method according to claim 4, wherein in a case that the first information comprises the TA adjustment signaling, if the terminal is capable of restarting a new second time window after one second time window, the method further comprises any one of the following:

applying, by the terminal, a new TA to an uplink transmission in the new second time window and a time window after the new second time window;

before the uplink transmission ends, performing, by the terminal, no TA adjustment; and determining, by the terminal based on the capability of the terminal, whether to perform a TA adjustment.

8. The time window determination method according to claim 1, wherein the first transmission gap is further determined based on at least one of:

first duration greater than a second threshold, wherein the first duration is duration within which an actual repetition is discarded;

second duration greater than a third threshold, wherein the second duration is duration corresponding to a length of an unavailable symbol; or a measurement gap.

9. The time window determination method according to claim 1, wherein the beam switching configuration information comprises cyclic mapping pattern configuration information, wherein in a case that the beam switching configuration information comprises the cyclic mapping pattern configuration information, the cyclic mapping pattern configuration information is not used for beam switching for an uplink transmission configured with joint channel estimation.

10. The time window determination method according to claim 1, wherein the beam switching configuration information comprises sequential mapping pattern configuration information, wherein in a case that the beam switching configuration information comprises the sequential mapping pattern configuration information, if the sequential mapping pattern configuration information is used for beam switching for an uplink transmission configured with joint channel estimation, the number of continuous repetitions or continuous slots that use a same beam in the uplink transmission configured with joint channel estimation is X, wherein X is greater than or equal to N and X is less than or equal to a configured length of the first time window, and N is the number of continuous repetitions or continuous slots that use a same beam as indicated by the sequential mapping pattern configuration information.

11. A terminal, comprising a processor, a memory, and a program or instructions stored in the memory and executable on the processor, wherein the program or the instructions, when executed by the processor, cause the terminal to perform:

determining at least one second time window based on first information and a first time window, wherein the first time window is a configured demodulation reference signal (DMRS) bundling time window, the second time window is an actual DMRS bundling time window, an uplink transmission within the actual DMRS bundling time window is a transmission that meets a first condition, and the first condition comprises maintaining power consistency and phase continuity;

wherein the program or the instructions, when executed by the processor, cause the terminal to perform:

after the terminal determines that the first information is received, determining that the first condition is not met within the first time window; and determining the at least one second time window within the first time window;

wherein the first information comprises first target information, and the first target information comprises at least one of:

beam switching configuration information;

configuration information of a physical downlink control channel (PDCCH) monitoring occasion; or information related to a first transmission gap; and wherein the first transmission gap is determined based on at least one of:

unscheduled symbols with a quantity exceeding a first threshold; or an uplink transmission symbol, wherein the uplink transmission symbol is used to transmit an uplink transmission other than a current uplink transmission, and a length of the uplink transmission symbol is not limited to being greater than a length of 13 orthogonal frequency division multiplexing (OFDM) symbols.

12. The terminal according to claim 11, wherein the program or the instructions when executed by the processor, cause the terminal to perform:

determining that a 1-st second time window is from a start moment of the first time window to the first moment; and after determining the 1-st second time window, in a case that the terminal is capable of restarting a new second time window after one second time window, determining all second time windows except the 1-st second time window within the first time window.

13. The terminal according to claim 12, wherein the terminal is capable of restarting a new second time window after one second time window;

the program or the instructions when executed by the processor, cause the terminal to perform:

determining the at least one second time window, until a last second time window within the first time window and all other second time windows than the 1-st second time window and the last second time window within the first time window are determined, wherein one of the other second time windows uses a first uplink available slot or symbol after a first event as a start moment and a next first event as an end moment, the last second time window uses a first uplink available slot or symbol after a first event as a start moment and an end moment of the first time window as an end moment, there is no overlap among all the second time windows within the first time window, and the first event is an event indicated by the first information representing that the first condition is not met within the first time window.

14. The terminal according to claim 11, wherein the first target information further comprises at least one of:

frequency hopping interval information;

precoder cycling granularity configuration information;

power adjustment signaling; or timing advance (TA) adjustment signaling.

15. The terminal according to claim 14, wherein to determine the at least one second time window based on the first information and the first time window, the program or the instructions when executed by the processor, cause the terminal to perform:

determining that a moment of frequency hopping position switching indicated by the frequency hopping interval information is an end moment of the second time window; or determining that a moment of precoder switching indicated by the precoder cycling granularity configuration information is an end moment of the second time window.

16. The terminal according to claim 14, wherein in a case that the first information comprises the power adjustment signaling, if the terminal is capable of restarting a new second time window after one second time window, the program or the instructions when executed by the processor, cause the terminal further to perform:

applying new power to an uplink transmission in the new second time window and a time window after the new second time window;

before the uplink transmission ends, performing no power adjustment; and determining based on the capability of the terminal, whether to perform a power adjustment.

17. The terminal according to claim 11, wherein the first transmission gap is further determined based on at least one of:

first duration greater than a second threshold, wherein the first duration is duration within which an actual repetition is discarded;

second duration greater than a third threshold, wherein the second duration is duration corresponding to a length of an unavailable symbol; or a measurement gap.

18. The terminal according to claim 11, wherein the beam switching configuration information comprises cyclic mapping pattern configuration information, wherein in a case that the beam switching configuration information comprises the cyclic mapping pattern configuration information, the cyclic mapping pattern configuration information is not used for beam switching for an uplink transmission configured with joint channel estimation.

19. The terminal according to claim 11, wherein the beam switching configuration information comprises sequential mapping pattern configuration information, wherein in a case that the beam switching configuration information comprises the sequential mapping pattern configuration information, if the sequential mapping pattern configuration information is used for beam switching for an uplink transmission configured with joint channel estimation, the number of continuous repetitions or continuous slots that use a same beam in the uplink transmission configured with joint channel estimation is X, wherein X is greater than or equal to N and X is less than or equal to a configured length of the first time window, and N is the number of continuous repetitions or continuous slots that use a same beam as indicated by the sequential mapping pattern configuration information.

20. A non-transitory readable storage medium, wherein the non-transitory readable storage medium stores a program or instructions, and the program or the instructions, when executed by a processor, cause the processor to perform:

determining at least one second time window based on first information and a first time window, wherein the first time window is a configured demodulation reference signal (DMRS) bundling time window, the second time window is an actual DMRS bundling time window, an uplink transmission within the actual DMRS bundling time window is a transmission that meets a first condition, and the first condition comprises maintaining power consistency and phase continuity;

wherein the program or the instructions, when executed by the processor, cause the processor to perform:

after the terminal determines that the first information is received, determining that the first condition is not met within the first time window; and determining the at least one second time window within the first time window;

wherein the first information comprises first target information, and the first target information comprises at least one of:

beam switching configuration information;

configuration information of a physical downlink control channel (PDCCH) monitoring occasion; or information related to a first transmission gap; and wherein the first transmission gap is determined based on at least one of:

unscheduled symbols with a quantity exceeding a first threshold; or an uplink transmission symbol, wherein the uplink transmission symbol is used to transmit an uplink transmission other than a current uplink transmission, and a length of the uplink transmission symbol is not limited to being greater than a length of 13 orthogonal frequency division multiplexing (OFDM) symbols.

* * * * *